May 7, 1929. V. JERECZEK 1,711,601
TRACTOR WITH CHAIN TRACK DRIVE
Filed Feb. 25, 1927
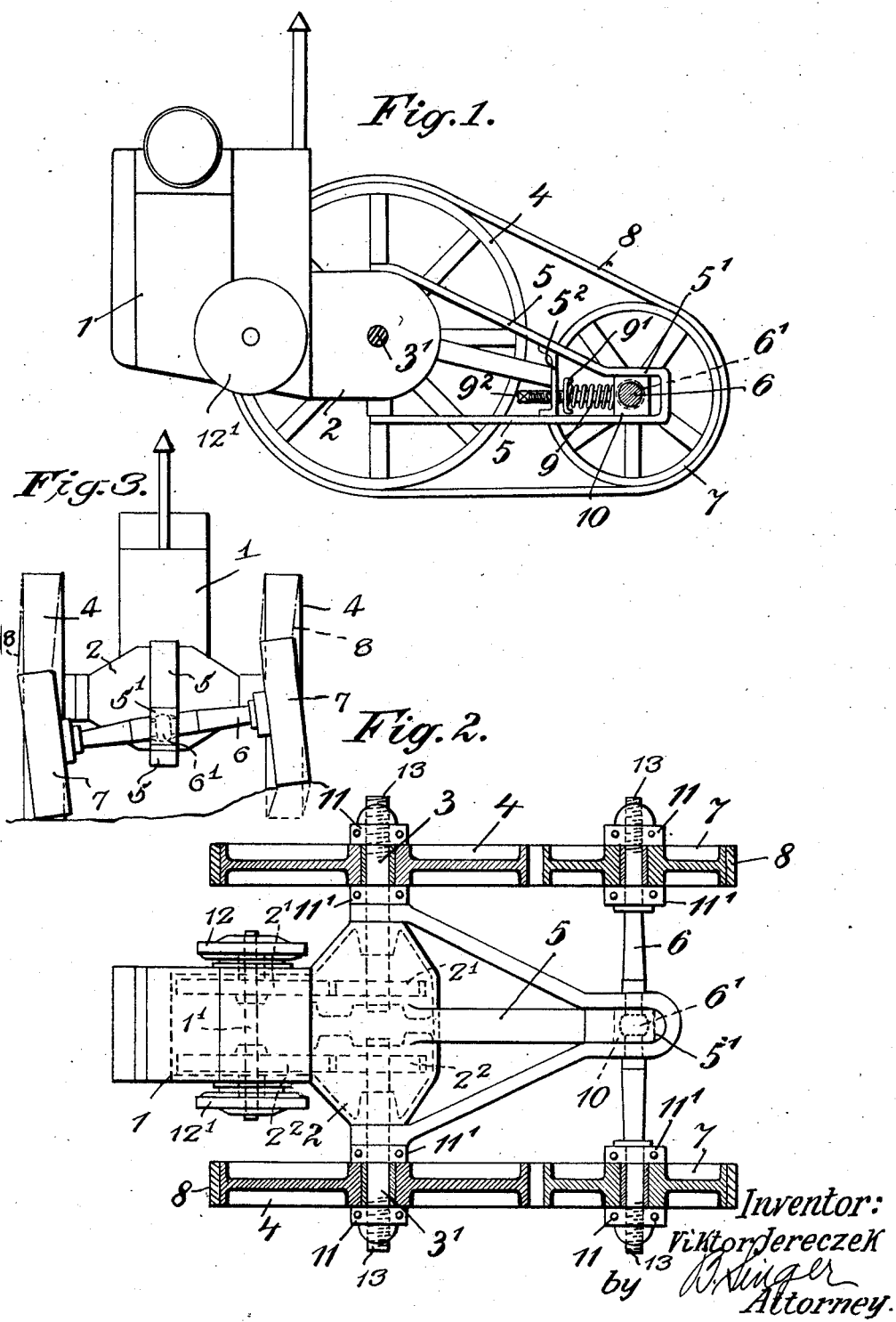
Inventor:
Viktor Jereczek
by
Attorney.

Patented May 7, 1929.

1,711,601

UNITED STATES PATENT OFFICE.

VIKTOR JERECZEK, OF WEISSENSEE, NEAR BERLIN, GERMANY, ASSIGNOR TO STOCK MOTORPFLUG AKTIENGESELLSCHAFT, OF BERLIN, GERMANY, A CORPORATION OF GERMANY.

TRACTOR WITH CHAIN-TRACK DRIVE.

Application filed February 25, 1927, Serial No. 171,022, and in Germany December 17, 1925.

My invention concerns a tractor with chain track drive. Tractors of this kind hitherto known were in consequence of the strong vehicle frame and particularly in consequence of the casings and guides for the chain tracks hitherto necessary very heavy and therefore little suited as tractors for commerce or agriculture. In addition the rigid and inaccessible construction as a whole impeded the universal introduction of the chain track vehicle.

The object of my invention is to produce a chain track vehicle which does not possess the disadvantages referred to and which in consequence of its light weight and simple construction may be employed as a tractor everywhere. The invention consists essentially in that a two-wheeled motor carriage is connected by struts or the like with an axle for the second pair of wheels, said axle being acted upon by a tensioning device for the chain tracks. The heavy vehicle parts and the guides for the chain tracks are dispensed with.

In order to enable the chain tracks to be well adapted to irregularities of the ground, the vehicle frame proper can be pivoted at three points on the vehicle axles. With narrow gauge and small wheel base it is then possible for the chain track to suit itself to irregularities of the ground and thereby sufficient stability of the vehicle is ensured.

As a result of the free arrangement of the chain tracks it is possible to mount the chain track wheels on their axles so that they are displaceable and thereby to alter the gauge. It is therefore possible, when using the vehicle for agricultural purposes, in drawing hoes, turnip lifters and so forth to suit it to the width of the rows of the plants.

In the accompanying drawing one form of construction of the tractor according to my invention is illustrated diagrammatically by way of example.

Fig. 1 is a side elevation;
Fig. 2 is a plan partly in section, and
Fig. 3 is a rear elevation of the machine.

In a casing 2 carrying the motor 1 and the gears $2^1$ and $2^2$ with the two couplings 12 and $12^1$ for engaging in well known manner one or both of these gears with the main power shaft $1^1$, are journalled the two axles 3 and $3^1$ for the two driving wheels 4 which are independently driven by said gear. A strut 5 is connected with the casing 2. The rear end of this strut has the form of a guide $5^1$ in which a bearing block 10 is movably arranged. In the latter an axle 6 is journalled which carries the two chain guide wheels 7. On the block 10 acts a spring 9, the other end of which rests against a spring collar $9^1$ connected with a screw spindle $9^2$. The latter can be screwed in a distance piece $5^2$ of strut 5, whereby the spring 9 may be tensioned. By this means the bearing block 10 and the axle 6 are so displaced that the chain tracks 8 are always taut. The axle 6 is spherically shaped at $6^1$ inside the correspondingly formed bearing block 10, so that it can adjust itself independently of the axle of the front wheels 4 and thereby permit the adaption of the track chains to irregularities of the ground.

The adjustment of the wheel gauge can be effected by unscrewing or outwardly displacing clamping rings 11 disposed outside wheels 4 and 7 on the axles thereof, that for this purpose are provided with a screw thread 13 at their outer ends, and by inserting clamping rings $11^1$ of appropriate thickness on the axles 3, $3^1$ and 6 to the inside of the wheels.

The guiding of the vehicle is effected in known manner by braking or declutching the drive of one or other of the two driving wheels 4.

Instead of the motor 1, having its longitudinal axis across to the longitudinal axis of the vehicle, a motor may be used of which the longitudinal axis lies in the longitudinal axis of the vehicle. In this case the drive of the driving wheels 4 is preferably effected by means of pinions and by toothed rings connected to the driving wheels.

It is naturally immaterial to the essence of the invention whether the drive of the tractor is effected from the front or rear axle of the vehicle.

I claim:

1. A tractor with chain track drive, comprising in combination, a carriage having two wheels, a motor arranged on said carriage and adapted to drive said two wheels, a frame-like structure firmly connected to said carriage, an axle being journalled only at its middle part in said frame-like structure, two wheels fixed to said axle, said two wheels being arranged in the track of the first said two wheels, endless track laying means running over said wheels, and a tensioning device for said endless track laying means.

2. A tractor with chain track drive, comprising in combination, a carriage having two wheels, a motor arranged on said carriage and adapted to drive said two wheels, a frame-like structure firmly connected to said carriage, an axle being by a ball joint journalled at its middle part in said frame-like structure, two wheels fixed to said axle, said two wheels being arranged in the track of the first said two wheels, endless track laying means running over said wheels, and a tensioning device for said endless track laying means and acting upon said ball joint.

3. A tractor with chain track drive, comprising in combination, a carriage having two wheels, a motor arranged on said carriage and adapted to drive said two wheels, said wheels being shiftably arranged on their axles, and means for holding said wheels in position, a frame-like structure firmly connected to said carriage, an axle being journalled only at its middle part in said frame-like structure, two wheels fixed to said axle, said two wheels being shiftably arranged on its axle, and means for holding said wheels in position, endless track laying means running over said wheels, and a tensioning device for said endless track laying means.

In testimony whereof I have affixed my signature.

VIKTOR JERECZEK.